United States Patent [19]

Wharton

[11] 4,316,210

[45] Feb. 16, 1982

[54] VIDEO SIGNAL PROCESSING APPARATUS

[75] Inventor: James H. Wharton, Indianapolis, Ind.

[73] Assignee: RCA Corporation, New York, N.Y.

[21] Appl. No.: 181,989

[22] Filed: Aug. 28, 1980

[51] Int. Cl.³ .............................................. H04N 5/76
[52] U.S. Cl. ........................................ 358/4; 358/39;
 358/160; 358/166
[58] Field of Search ....................... 358/4, 8, 21 R, 31,
 358/39, 160, 166, 127, 128.5; 360/24, 33

[56] References Cited

U.S. PATENT DOCUMENTS

| | | | |
|---|---|---|---|
| 3,872,498 | 3/1975 | Pritchard | 358/21 R |
| 4,057,826 | 11/1977 | Baker | 358/4 |
| 4,096,513 | 6/1978 | Ross | 358/4 |
| 4,219,842 | 8/1980 | Miller | 358/21 R |

OTHER PUBLICATIONS

H. E. Ennes, "Television Broadcasting, Equipment, Systems, and Operating Fundamentals" Second Edition, 1979, p. 227.

Primary Examiner—Michael A. Masinick
Attorney, Agent, or Firm—E. M. Whitacre; J. S. Tripoli; R. G. Coalter

[57] ABSTRACT

The luminance component of a video signal subject to overshoot is preemphasized and clipped prior to application as a modulating signal to a frequency modulator. Overshoot of the luminance signal, which tends to cause clipping distortion of the modulating signal is minimized by generating a compensating signal representative of the horizontal detail component of the luminance signal. The luminance signal is delayed relative to the compensating signal and subtractively combined therewith prior to application to the clipping circuitry such that the resultant modulating signal exhibits preshoot and reduced overshoot thereby minimizing the clipping distortion. Compensation is effectively disabled for luminance signal overshoots below the clipping level by means of an adjustable coring circuit in the compensating signal path whereby luminance signals exhibiting overshoot below the clipping level are not distorted by the compensating signal.

23 Claims, 4 Drawing Figures

VIDEO SIGNAL PROCESSING APPARATUS

This invention relates to video signal processing apparatus and particularly to apparatus for forming a modulating signal for a picture carrier frequency modulator in systems, such as video disc or tape recording systems, that employ FM techniques in the translation of monochrome or color picture information.

In certain picture information processing systems, it is advantageous to employ FM techniques in the translation of video information. See, for example, U.S. Pat. Nos. 3,934,263; 4,022,968 and 4,005,474 which disclose video disc recording arrangements in which a recording signal is formed which includes a picture carrier wave modulated in frequency in accordance with the amplitude of a composite color video signal inclusive of luminance and chrominance components.

In such video disc (or tape) recording systems, bandwidth limitations of the recording media can limit the modulation index for higher frequency components of the video signal to such an extent that a signal-to-noise ratio loss may occur for signal frequency components near the higher end of the modulating signal bandwidth. For this reason, it is conventional practice in disc and tape recording systems to translate the chrominance signal from its normal location at the high end of the luminance band to a lower frequency where the effective modulation index is higher so that the chrominance component does not suffer a signal-to-noise ratio loss. Pritchard, in U.S. Pat. No. 3,872,498 discloses translating systems which interleave or "bury" the chrominance signal within the midband portion of the luminance signal band. This is commonly referred to as "buried subcarrier" encoding and prevents degradation of the chrominance signal-to-noise ratio for the aforementioned reasons.

While the chrominance signal-to-noise ratio may be preserved (or improved) by means of buried subcarrier encoding, a different approach is required to overcome the loss which occurs for higher frequency luminance components. Conventionally, the luminance signal is subjected to high frequency preemphasis prior to modulation of the FM carrier so that a signal-to-noise ratio improvement may be realized when a complementary high frequency deemphasis is imparted to the luminance component subsequent to demodulation of the FM carrier (e.g., in a video disc or video tape player).

One problem in obtaining a signal-to-noise ratio improvement of the luminance signal by means of preemphasis is that the video system dynamic range may be exceeded for short intervals, especially during abrupt signal changes. For example, on step transition of the luminance signal, preemphasis of the higher frequencies may result in large overshoots of the signal and this problem is compounded if the unpreemphasized luminance signal itself exhibits overshoots. The effect of such a condition in video disc mastering, if not compensated for, could be to cause the mastering cutterhead dynamic range to be exceeded and this, in turn, can lead to replication difficulties as well as result in the production of spurious signal effects (e.g., intermodulation distortion, beats, crosstalk, etc.) upon playback of the disc.

To lessen the effect of luminance signal overshoots, it is conventional practice to clip the preemphasized signal at predetermined levels prior to application to the picture carrier frequency modulator so that the clipping levels set precise boundaries for the picture carrier deviation range within a frequency region compatible with the recording system capabilities. This advantageously prevents excessive carrier deviation and thus prevents excessive excursions of the cutterhead in video disc mastering systems.

Notwithstanding its advantages, clipping is a non-linear process which results in loss of the informational content of the clipped portion of the signal and introduces distortion which may be evidenced by picture smear, serration of vertical edges, etc. These results place practical limitations on the amount of preemphasis which may be imparted to the luminance signal for signal-to-noise ratio enhancement.

Various approaches have been proposed for overcoming the problems of clipping of preemphasized luminance signals. In the arrangement proposed by M. D. Ross, for example, in U.S. Pat. No. 4,096,513, the luminance signal is preemphasized by about 12 dB, clipped, summed with the chrominance signal and the resultant signal is then clipped. For the reasons discussed in detail in the Ross patent, double clipping advantageously minimizes the problem or serration of vertical edges of a picture which can otherwise occur in conventional systems in which only the composite video signal is clipped. T. J. Christopher in U.S. Pat. Application Ser. No. 20334 filed Mar. 14, 1979, and now abandoned, describes an interactive clipper-preemphasis circuit in which clipped signals are, in effect, "stretched" by the clipper which modifies the preemphasis time circuit when activated. As explained in the Christopher application, the maintenance of clipping beyond the time it would normally terminate provides reduction of clipping distortion by, in effect, replacing a portion of luminance signal energy lost through conventional clipping with additional pulse energy provided by stretching or prolonging the clipped waveform.

The techniques proposed by Ross and Christopher are concerned mainly with improvements for reducing the effects rather than the cause of clipping. In the copending application Ser. No. 163,275 of J. G. Amery and the present inventor entitled "Video Signal Processing Apparatus" filed June 26, 1980, and now abandoned a cause of clipping of a preemphasized luminance signal is considered and related to the phase response of conventional preemphasis networks. A technique is proposed whereby additional preemphasis may be imparted to a luminance signal and in which clipping distortion under transient signal conditions may be reduced. These benefits are achieved by passing the luminance signal through two preemphasis networks, one of which exhibits a linear phase response and the other of which exhibits a non-linear phase response. The relative amplitude response characteristics of the networks are selected in a predetermined relationship such that the amplitude response of the combination exhibits a frequency dependent variation dominated by the non-linear phase network over a lower portion of the luminance band and dominated by the linear phase network over an upper portion of the luminance band.

The present invention resides in part in recognition of the need for further improvements in clipping distortion reduction and in part in the recognition that where the non-preemphasized luminance signal itself exhibits overshoot, that clipping distortion is aggravated by preemphasis even when the preemphasis is provided by linear phase (minimal overshoot) filters (linear phase preemphasis is, however, superior to non-linear phase preemphasis in that regard). More directly, regardless of whether the preemphasis is applied by linear or nonlinear phase networks (or a combination thereof as proposed by Amery et al), it is advantageous from a clipping distortion standpoint to modify the luminance signal in some manner to minimize overshoot. This object may be achieved, in accordance with the invention, by generating an anticipatory compensating signal which, when suitably combined with the luminance signal, effectively converts an overshoot into a preshoot whereby the overshoot amplitude is reduced and the probability of clipping is substantially reduced.

In video signal processing apparatus according to the invention a filter means responsive to transitions of an input luminance signal produces a compensating signal having an amplitude representative of the horizontal detail component of the luminance signal. Means are provided for establishing a relative time difference between the luminance signal and the compensating signal such that the luminance signal lags the compensating signal by a predetermined period of time. The compensating signal is then subtractively combined with the lagging luminance signal to provide a compensated luminance signal for application to signal clipping means, the relative time difference being selected such that the detail signal effects a preshoot of the compensated signal in a sense opposite to the sense of a given luminance transition to minimize the tendency of overshoot which may accompany the luminance signal transition from activating the signal clipping means.

In accordance with a further aspect of the invention means are provided for effectively disabling the detail filter means when the compensating signal is less than a predetermined applitude.

In accordance with another aspect of the invention the means for establishing a relative time difference between the compensating and luminance signals serves an additional function of luminance signal vertical detail enhancement.

In accordance with yet another aspect of the invention the means for establishing a relative time difference between the compensating and luminance signals serves an additional function of preemphasizing the luminance signal.

Figure 1:
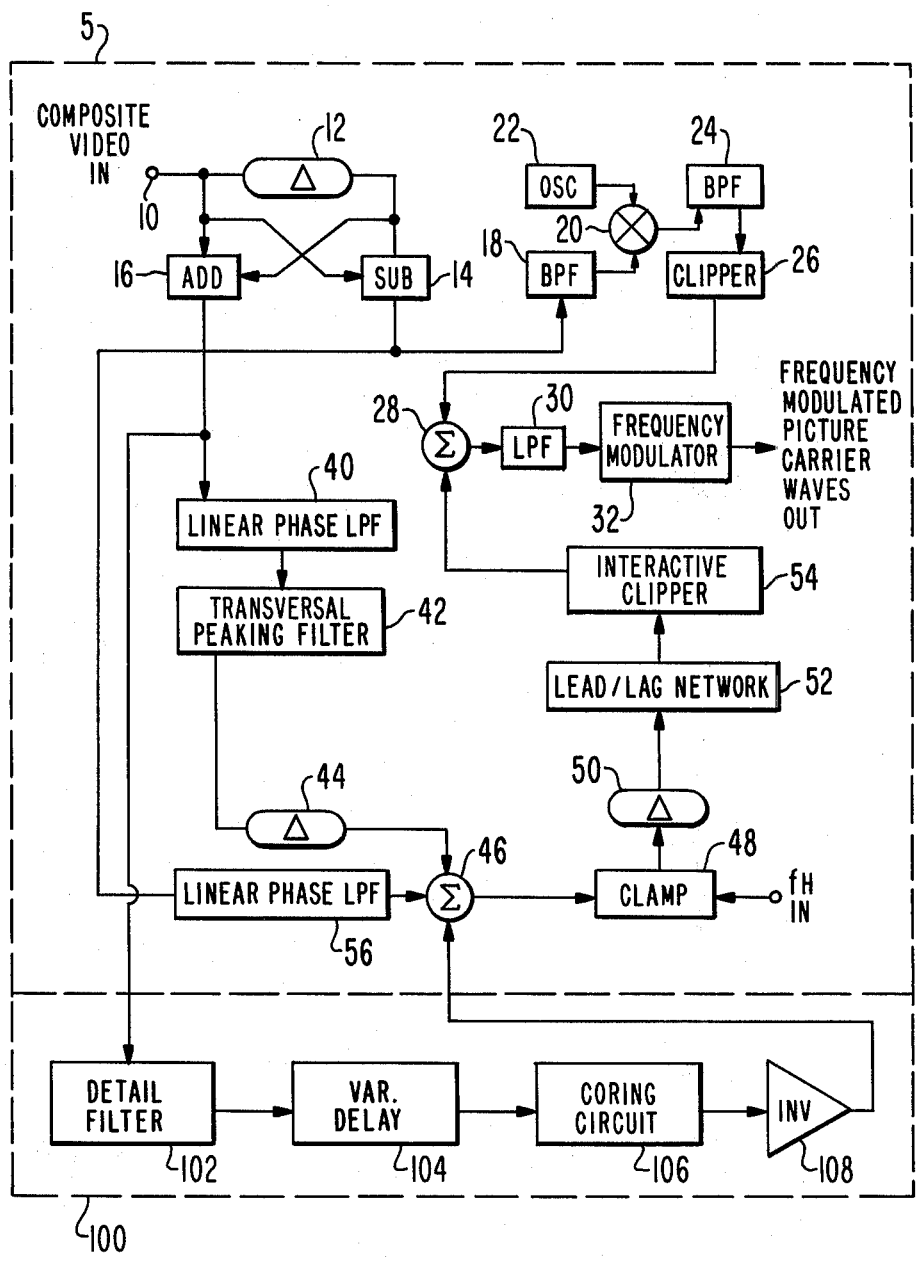
FIG. 1 is a block diagram of video signal processing apparatus embodying the invention.

The apparatus of FIG. 1 illustrates the preferred embodiment of the principles of the invention for reducing clipping distortion in a video converter 5 (outlined in phantom) of the type described by Amery et al. in their previously mentioned patent application. It is a feature of this specific application of the invention that certain elements within the video converter 5 cooperate with elements within the overshoot compensator 100 to provide multiple functions. As will be explained in detail subsequently, summing circuit 46 provides the function in converter 5 of additively combining a vertical detail augmentation signal and a partially preemphasized combed luminance signal. In combination with inverter 108, of compensator 100, however, summing circuit 46 provides the added function of subtractively combining a cored overshoot compensation signal with a delayed partially preemphasized vertical detail augmented luminance signal. As another example, the filters 40, 42, 56 and delay element 44 which provide for partial preemphasis and vertical detail filtering of a luminance signal in converter 5 serve the added function (in combination with variable delay element 104) in compensator 100 of establishing a relative time difference between a luminance signal and an overshoot compensation signal such that the latter effectively anticipates the former at the inputs of the subtractive combiner.

The function of video converter 5 is to convert a composite signal of a standard format to one of the previously mentioned buried subcarrier format proposed by Pritchard for producing a frequency modulated picture carrier wave output signal suitable for recording on bandwidth limited media such as video discs or tapes or for transmission through other relatively narrow band transmission channels or media. For ease of illustration it is assumed that the composite video input signal is of NTSC format. The principles of the invention are readily adaptable, however, to other video standards such as PAL or SECAM by appropriate modification of the chrominance conversion portion of the apparatus and suitable selection of parameters such as delay line lengths, filter bandwidths, clipping reference levels, etc., to conform to the desired standard.

The composite video signal is applied to an input terminal 10 and separated into luminance and chrominance components by means of complementary comb filtering. The comb filter comprises a delay line 12 which delays the composite signal by one line interval (e.g., about 64 microseconds in the NTSC standard), a subtraction circuit 14 which subtracts the delayed from the non-delayed signal and an addition circuit 16 which adds the delayed and non-delayed signals. As explained in detail in the aforementioned Pritchard patent, the process of adding the delayed and non-delayed composite video signal results in a comb filter characteristic for the luminance signal (produced at the output of adder circuit 16) which exhibits recurring peaks at multiples of the line frequency and recurring nulls of "troughs" at odd multiples of half the line frequency. Subtraction of the delayed and non-delayed signals results in a comb filter characteristic for the chrominance signal (and luminance components below the chrominance signal band) which is complementary (i.e., it exhibits recurring peaks at odd multiples of half the line frequency and nulls at multiples of the line frequency).

The purpose of separating the luminance and chrominance signals by means of comb filtering (rather than simple lowpass and high pass filtering) is to prepare troughs in the luminance signal for receiving the chrominance signal after translation of the chrominance signal to a lower frequency. Since the chrominance signal is comb filtered with a complementary characteristic it can be interleaved with the luminance signal without producing "crosstalk" by appropriate choice of the new chrominance subcarrier frequency.

The precise frequency of the new chrominance subcarrier is chosen to be offset from a multiple of the line frequency (fH) associated with the video signal by a fraction of the line frequency (preferably by fH/n, where n is a small integer greater than unity). A particularly advantageous offset choice is a half line frequency (fH/2) offset, although other offset choices may be appropriate under special circumstances (as for example, where a PAL form is chosen for the subcarrier, and a quarter line frequency —fH/4—offset is suitable). An illustrative subcarrier frequency choice incorporating an fH/2 offset is 195/2 fH (or approximately 1,534,091 Hz, hereinafter 1.53 MHz) when the apparatus of FIG. 1 is used for processing NTSC standard input signals.

Conversion of the chrominance signal from the NTSC subcarrier frequency (about 3.58 MHz) to the buried subcarrier frequency (1.53 MHz) is provided by applying the output of subtraction circuit 14 to a bandpass filter 18 which, illustratively, has a center frequency of 3.58 MHz and a bandwidth of about 1 MHz. Filter 18 thus rejects the lower frequency combed luminance components which are also produced at the output of subtraction circuit 14 and passes only the combed chrominance signal to a multiplier 20 where it is multiplied or "mixed" with a reference frequency produced by an oscillator 22. The reference frequency is selected to equal the sum of the NTSC color subcarrier frequency (3.58 MHz) and the desired buried subcarrier frequency (1.53 MHz) so that product signals are produced by multiplier 20 of 1.53 MHz and 8.69 MHz. The lower of the product signals is passed to a chrominance clipping circuit 26 by means of a bandpass filter having a passband centered at 1.53 MHz.

The output of the chrominance clipper circuit 26 is applied to a summing circuit 28 where it is combined with a luminance signal which is preemphasized in accordance with the teachings of Amery et al. in their aforementioned patent application and which receives overshoot compensation in accordance with the present invention. The resultant composite buried subcarrier format video signal is then applied via a low pass filter 30 to the input of a frequency modulator 32 which produces a frequency modulated picture carrier wave output signal. Since, as will be explained, the luminance signal is also clipped, the composite signal produced at the output of summing circuit 28 is confined to predetermined limits thereby preventing excessive frequency deviation of modulator 32. The purpose of lowpass filter 30 (which, illustratively, may have a cutoff frequency equal to or somewhat higher than the highest luminance signal frequency, e.g., 3 MHz or so) is to prevent the high frequencies that are produced when the luminance or chrominance signals exceed the clipping thresholds from reaching modulator 32.

As an alternative to clipping the chrominance signal prior to summation with the preemphasized luminance signal, clipper circuit 26 may be deleted and the composite signal may be clipped by interposing a clipping circuit between the output of summing circuit 28 and lowpass filter 30. Such an arrangement is shown and described in U.S. Pat. No. 4,096,513 which issued to M. D. Ross on June 20, 1978. If this is done the composite signal clipping circuit should have clipping levels beyond those of the clipping circuit in the luminance signal channel. As explained by Ross, clipping of the luminance signal followed by clipping of the composite signal advantageously eliminates the problem of a serrated appearance of the vertical edges of images processed by systems in which only the composite signal is clipped prior to frequency modulation of the FM carrier wave. The double clipping arrangement of FIG. 1 provides a similar advantage and also allows individual settings of the luminance and chrominance clipping levels.

The remaining elements of video converter 5 provide various luminance signal processing functions such as linear phase preemphasis, vertical detail augmentation, clamping, luma-chroma differential delay compensation, non-linear phase preemphasis and clipping. With the exception of vertical detail augmentation, these functions are provided by coupling the output of adder circuit 16 to the input of summing circuit 28 via a cascade connection of elements including, in the order named, a linear phase lowpass filter 40, a transversal peaking filter 42, a delay line 44, a summing circuit 46, a clamp circuit 48, a delay line 50, a lead/lag network 52 and an interactive clipper circuit 54. Vertical detail augmentation is provided by a further linear phase lowpass filter 56 coupled between the output of subtraction circuit 14 and an input of summing circuit 46 in the cascade connection.

In more detail, lowpass filter 40, limits the luminance signal bandwidth to about 3 MHz and is of a type exhibiting a substantially constant delay whereby the phase shift introduced by the filter varies linearly with frequency. Gaussian filters and the well known Thompson or Kastelein networks have this property but exhibit a relatively gradual rolloff to and beyond what may be considered band edge. In order to extend the luminance preemphasis to the higher end of the luminance signal band (e.g., 3 MHz) filter 40 is connected in cascade with a transversal peaking filter 42 having a delay selected to provide peaking at band edge. Transversal peaking filters also exhibit a linear phase characteristic so that the combination of filters exhibits minimal overshoot in response to luminance signal transitions. The Amery et al. patent application provides specific examples of implementation of filters 40 and 42. See also "THE SYNTHESIS OF A NETWORK TO HAVE A SINE-SQUARED IMPULSE RESPONSE" by W. E. Thompson, Proc. IEE (London), Vol. 99, part III, p373 et.seq., 1973; "A NEW SINE-SQUARED PULSE AND BAR SHAPING NETWORK" by A. Kastelein, IEEE Transactions On Broadcasting, Vol. BC-16, NO. 4, p84 et.seq., December 1970; and "TELEVISION BROADCASTING, EQUIPMENT, SYSTEMS & OPERATING FUNDAMENTALS" by H. E. Ennes published by Howard W. Sams & Co., Inc., second edition, 1979, p227.

Linear phase (i.e., minimal overshoot) preemphasis is also performed in an auxiliary path coupled to a point (e.g., summing circuit 46) in the principle luminance processing path (40–54). The auxiliary path comprises the connection of lowpass filter 56 between the output of subtraction circuit 14 and an input of summing circuit 46. Filter 56 is selected to have a linear phase (constant delay) characteristic and an amplitude response which extends to about the lowest buried subcarrier chrominance signal frequency. For the illustrated system, a suitable choice would be about 1 MHz for a 1.53 MHz buried subcarrier frequency choice which has sidebands extending ±500 KHz thereabout.

The purpose of the auxiliary luminance path is to augment the vertical detail components of the luminance signal by replacing the components which were "combed" or removed from the luminance signal appearing at the output of addition circuit 16. From the previous discussion, the comb filter characteristic at the output of subtraction circuit 14 is complementary to that produced at the output of addition circuit 16. Accordingly, when the 0–3 MHz luminance signal produced by circuit 16 is summed in summing circuit 46 with the 0–1 MHz luminance signal produced by subtraction circuit 14 and filtered by filter 56, the composite luminance signal is essentially uncombed up to 1 MHz and combed in the 1–3 MHz region for receiving the down converted buried subcarrier luminance signal. This filling in of the luminance spectrum below 1 MHz advantageously replaces information representative of the vertical detail of the picture signal.

The purpose of delay element 44 (e.g., a delay line) is to provide compensation for the different luminance signal delay times through the path including filters 40 and 42 and the path including filter 56. A delay difference results because of the different bandwidths of the filters. Illustratively, the delay through each of filters 40 and 42 may be on the order of about 100 nSec. and that through filter 56 may be about 500 nSec. Accordingly, to equalize luminance delay up to summing circuit 46, delay element 44 should be set to equal the delay difference in the two paths (e.g., 300 nSec.).

In order that interactive clipper circuit 54 may set precise boundaries for the luminance signal relative to conventional transmission levels, the luminance signal produced at the output of circuit 46 is periodically clamped to a d.c. reference level by means of clamp circuit 48 which receives a line frequency input signal fH for timing purposes. Suitable clamping or "d.c. restoration" circuits are well known. Expressed in terms of IRE units (where maximum picture white level prior to preemphasis is +100 units sync pedestal is 1 unit and sync tip is −40 units) clamp circuit 48 may be set to clamp the "back porch" region of the horizontal synchronizing pulse to a level of about 1 unit. A suitable choice of clipping levels for the luminance clipper circuit 54 is +140 and −66 IRE units.

Additional delay equalization is provided in the luminance processing signal path by means of delay element 50 coupled to the output of clamp circuit 48. The purpose of this delay is to provide further delay in the luminance path which, in combination with the 500 nSec. of delay up to summing circuit 46 equals the sum of the delays of filters 18 and 24 in the chrominance converter (18–26). By this means it may be assured that the chrominance portion of the composite video output signal is in registration with the luminance portion of the signal. In the example given, the delays of the 1MHz band pass chrominance filters 18 and 24 total about 1000 nSec. Since the luminance signal receives a delay on the order of 500 nSec up to summing circuit 46, delay element 50 should be selected to provide an additional 500 nSec. of delay. Since, as a practical matter, the actual filter delays may differ somewhat from the desired values it is preferable that element 50 be variable (e.g., a tapped delay line). Since element 50 operates upon the summed "vertical detail" and broad band luminance signal, the delay of each changes with the settings of element 50. This provides an advantage in that only a single control element need be adjusted to achieve correct luminance and chrominance registration.

The output of delay element 50 is applied to a lead-lag type of preemphasis network 52 and clipped by means of an interactive clipper circuit 54 prior to summation with the buried subcarrier chrominance signal in summing circuit 28. Network 52 is of a type having a non-linear phase characteristic and an amplitude response characteristic which increases by a predetermined amount over a lower portion of the luminance signal frequency band and assumes a substantially constant level over an upper portion of the luminance signal frequency band. For the system under consideration, an illustrative choice of a lead and lag break frequencies is 0.25 MHz and 1.0 MHz, respectively.

Network 52 may comprise a resistance-capacitance network such as that shown in the aforementioned Ross U.S. Pat. No. (4,096,513) or a resistance inductance network such as that shown in the U.S. Patent Application of T. J. Christopher, Ser. No. 20,334 filed Mar. 14, 1979. The aforementioned Amery et al. application discloses a preferred implementation of a resistance-inductance network which has a lead break point of 0.25 MHz, a lag break point of 1.0 MHz, a slope of 6 dB/Octave, a two octave spread and which provides a net 12 dB of boost to high frequency luminance signal components.

Clipper circuit 54 is referred to herein as an "interactive" clipper to signify that, when activated, it modifies the characteristics of lead-lag network 52 in accordance with the teachings of Christopher in his aforementioned patent application. Specifically, circuit 54 comprises diodes directly coupled to the resistance-inductance lead-lag network 52 which, when forward biased by a luminance signal of clipping level, changes the network 52 time constant such that the clipped signal is "stretched". As explained in detail in the Christopher application, the maintenance of clipping beyond the time it would normally terminate provides reduction of clipping distortion by, in effect, replacing a portion of luminance signal energy lost through conventional clipping with additional pulse energy provided by stretching or prolonging the clipped waveform.

A preferred implementation of the Christopher clipper circuit is disclosed in the Amery et al. application wherein the clipping diodes are implemented by means of transistor base emitter junctions and wherein each transistor (Q3, Q4) operates in a common base configuration with reference voltages applied to their respective base electrodes for setting the luminance clipping levels. As an alternative, clipper circuit 54 may be of the non-interactive type as shown in the Ross U.S. Pat. No. (4,096,513) in which case the lead-lag network may be either of the resistance-capacitance type (also shown in Ross) or of the resistance-inductance type, (shown in the Christopher application).

It is an advantage of video converter 5 that additional preemphasis is imparted to the higher frequency components of the luminance signal above the lag breakpoint of network 52 (e.g., 1 MHz) by means of filters 40 and 42 with minimal degradation of the overall luminance channel transient response. This results because the filters which process the higher frequency luminance components which control the rise time and thus the horizontal "detail" of the luminance signal have a linear phase response and thus do not distort the phase relationships among higher frequency components. This is true also of lead-lag network 52 since the higher frequency luminance components (e.g., 2–3 MHz) are far removed from the network transition region (0.25 to 1.0 MHz) where the phase response is a non-linear function of frequency.

In view of the nearly ideal phase characteristics of the luminance processing channel of video converter 5 one might well expect that no problem exists with regard to its transient response. This is, in fact, the case when one assumes that the video signal applied to terminal 10 is distortionless. In practice, however, it has been found that where the luminance component of the input signal exhibits overshoot, excessive clipping may occur in clipper circuit 54 owing to the substantial amount of high frequency preemphasis imparted to the luminance signal. Overshoot compensator 100, in combination with certain elements of converter 5 correct this problem without loss of preemphasis by detecting the horizontal detail component of the luminance signal and subtractively combining the luminance and detail components in a timed relationship such that the detail signal effectively anticipates the luminance signal creating a preshoot and minimizing overshoot of the resultant signal.

Overshoot compensator 100 comprises a cascade connection, in the order named, of a horizontal detail filter 102, a variable delay element 104, a coring circuit 106 and an inverter 108 coupled between the output of adder circuit 16 and an input of summing circuit 46 in video converter 5. Filter 102 serves to detect the horizontal detail component of the luminance signal i.e., the high frequency components which determines the maximum rate of change of the luminance signal. Of the various way in which one might consider deriving the detail signal from the luminance signal, the preferred method is to apply the luminance signal to a transversal peaking filter of the type having a high pass characteristic as exemplified by FIG. 2. Alternatively, detail filter 102 may be implemented by a conventional transversal peaking filter connected in cascade with a high pass filter as exemplified by FIG. 3. Design parameters and operation of the detail filters will be described subsequently.

Variable delay element 104 may comprise a conventional tapped delay line and provides the function of delaying the detail signal produced by filter 102 for a time slightly less than the sum of the delays of filters 40, 42 and delay element 44 which, as previously explained, is about 500 nSec. In this way the detail signal, experiencing a slightly shorter delay (e.g., 500 nSec. less a few tens of nanoseconds) is rendered in effect anticipatory of the luminance signal at summing circuit 46. Since the detail signal is inverted by means of inverter 108, summing circuit 46 in addition to providing the previously mentioned function of additively combining the main luminance signal with the vertical detail augmenting luminance signal provides the further function of subtractively combining the luminance and detail signals.

Since the detail signal is "early" or preceeds the luminance signals and is of a sense opposed to the sense of a given luminance transition, the resultant signal produced at the output of summing circuit 46 is caused to exhibit a preshoot and substantially reduced overshoot. These effects, taken together, substantially lessen the likelihood of activation of interactive clipper 54 and therefore reduce the clipping distortion of video converter 5 in response to overshoot of input luminance signals.

Figure 4:
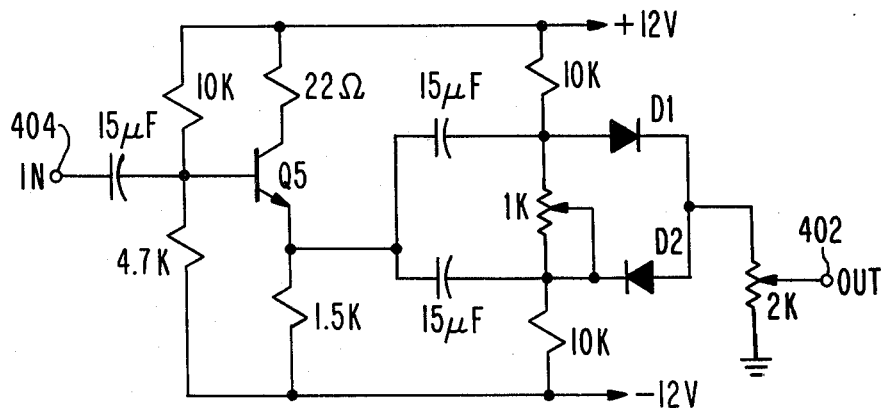
FIG. 4 is a circuit diagram of a coring circuit suitable for use in the apparatus of FIG. 1.

In cases where the input luminance signal is of such a low amplitude that clipper circuit 54 would not be activated it is desirable to disable overshoot compensator 100 whether or not overshoot is present. The preferred method of accomplishing this objective is to core the detail signal. Preferably the coring is done at a point subsequent to generation of the detail signal (i.e., the output of filter 102) but prior to its application to the subtractive combiner. This is provided by coring circuit 106 interposed between delay element 104 and inverter 108. Preferably, coring circuit 106 is adjustable so that the point at which the overshoot compensator is disabled may be changed, if desired, to provide different levels of overshoot compensation for input video signals of differing quality. As an example, where the input signal exhibits little overshoot the coring level may be set to a relatively high value since little overshoot compensation will be needed. Conversely, where the input signal is characterized by pronounced overshoot the level of coring circuit 106 may be lowered. A preferred adjustable coring circuit is shown in FIG. 4 and discussed subsequently.

It will be appreciated that a relative time difference between the detail and luminance signals is established in the example of FIG. 1 by the difference in the delay provided by element 104 in compensator 100 and that provided by the preemphasis elements in video converter 5. It is not essential, however, that compensator 100 contain a delay element. An alternative would be to interpose a delay element in cascade with a summing circuit between the output of summing circuit 46 and the input of clamp circuit 48. The input of detail filter 102 would then be connected to the output of circuit 46, the output of inverter 108 would be connected to the input of the added summing circuit and delay element 104 could then be deleted from the compensator 100. The added delay element preferably should be adjustable (for the same reasons as the deleted element 104) and need only provide a relatively short delay on the order of a few tens of nanoseconds.

For either method of establishing a relative time difference between the detail and luminance signals a preferred method of adjusting the delay is to apply T-pulses to the apparatus which exhibit preshoot and undershoot and have a half amplitude duration near the limits of the luminance channel bandwidth (T-pulses or sine squared impulses are conventionally used for testing the transmission characteristics of video transmission channels and generators for producing such pulses are commercially available). A 2T-pulse has been found satisfactory for this purpose. One then may adjust parameters such as gain, coring level and delay until the output 2T-pulse exhibits preshoot substantially equal to the undershoot of the input 2T-pulse i.e., until the resultant signal exhibits preshoot and undershoot symmetry and the magnitude of the overshoot is reduced to an acceptable level relative to the clipping threshold of circuit 54. To effect amplitude control of the detail signal a variable gain element (e.g., a potentiometer) may be interposed in the cascade connection of elements 102-108.

Figure 2:
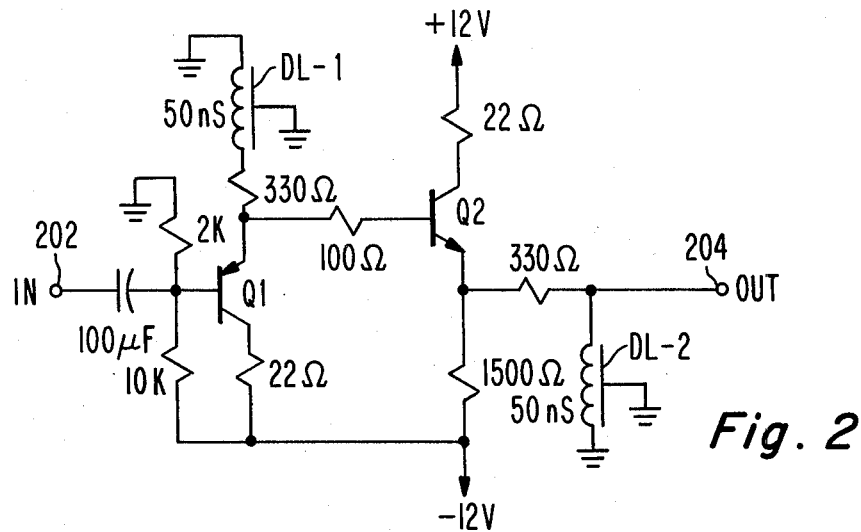
FIG. 2 is a circuit diagram of a detail filter suitable for use in the apparatus of FIG. 1.
Figure 3:
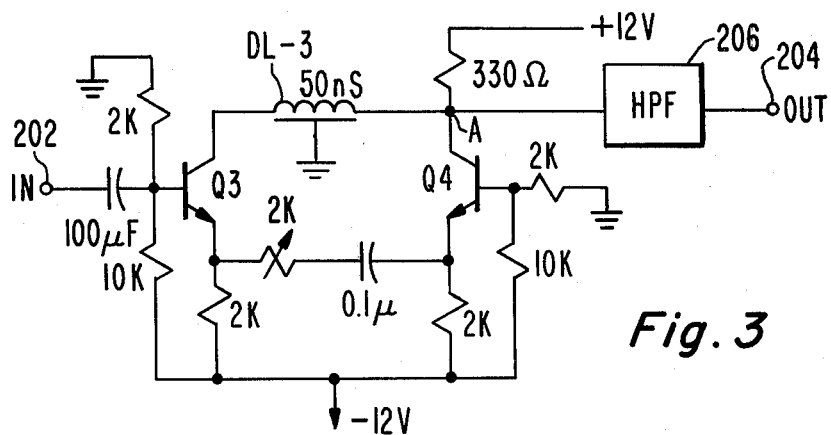
FIG. 3 is a circuit diagram, partially in block form, of an alternative detail filter suitable for use in the apparatus of FIG. 1.

The detail filters of FIGS. 2 and 3 are similar in that they both rely on reflections generated by 50 nanosecond delay lines which are driven by sources having an output impedance equal to the line characteristic impedance (330 ohms) and terminated by impedances other than the characteristic impedance. They differ in the number of delay lines used, the terminating impedance levels (short circuit, open circuit) and the method of obtaining a high pass characteristic.

In FIG. 2, 50 nSec. delay lines DL-1 and DL-2 are short circuit terminated (grounded at one end) and driven by respective complementary cascaded PNP-NPN emitter follower transistors Q1 and Q2. The emitter coupling to each delay line is provided by a resistor having a value equal to the delay line characteristic impedance (330 ohms). Transistor Q1 is d.c. biased slightly negative with respect to ground (i.e., −2 volts) by means of a potential divider coupled between ground and a negative voltage supply (−12 volts). Transistor Q2 is biased via a 100 ohm resistor from the emitter of Q1 and being of opposite conductivity type produces a quiescent d.c. voltage at its emitter equal to that at the base of Q1. Since delay line DL-2 is referenced to ground, current for forward biasing the base emitter junction of Q2 is provided by a 1500 ohm resistor coupled between the Q2 emitter and the −12 volt supply. Operating current for the collector of Q2 is provided by a +12 volt supply and that for Q1 by the −12 volt supply. If the transistor types are reversed the supply voltages should also be reversed. Parasitic suppression is provided by a relatively low valued (100 ohm) interstage coupling resistor and transient protection is provided by relatively low valued (22 ohm) collector resistors. The d.c. component of the luminance input signal applied to the input terminal 202 is blocked by means of a very high valued blocking capacitor (100 μF). The time constant of the input bias network and the blocking capacitor is not critical but is selected to be sufficiently long as to have no significant effect on the passage of the higher frequency luminance components through the filter.

It is instructive to note that output terminal 204 is connected to the junction of DL-2 and its characteristic driving resistance (330 ohms). It is by this means that a high pass characteristic is imparted to the filter which otherwise would have a d.c. response extending as low as the cutoff frequency determined by the input bias and decoupling network. In operation, high frequency luminance signal components create reflections in delay lines DL-1 and DL-2 which are cumulative because of the cascade connection and create a response peak near the luminance band edge. The 330 ohm resistor which serves to drive delay line DL-2 and to damp its reflections also serves in combination with DL-2 as a high pass filter whereby the overall response of the filter is limited to only the detail components of the luminance signal and is unaffected by lower frequency components.

The detail filter of FIG. 3 is similar to the solid state aperture correction transversal filter described by H. E. Ennes at page 227 of the text "TELEVISION BROADCASTING, EQUIPMENT, SYSTEMS & OPERATING FUNDAMENTALS" published by Howard W. Sawc & Co., Inc., second edition, 1979. Such a filter, nominally used for correction of the aperture effect caused by the finite scanning spot size in camera tubes, may be used for detail filtering in the practice of the present invention provided that the response is limited to the upper region of the luminance signal band. This function is provided for in FIG. 3 by means of a high pass filter coupled between the output of the aperture correction filter (Node A) and output terminal 204. Ennes provides a detailed description of the dynamic response of the emitter coupled transistor pair Q3, Q4 and the effect of reflections in delay line DL-3. D. C. bias for transistor Q3 is established as in the example of FIG. 2 by means of a blocking capacitor and potential divider and for Q4 by means of a potential divider identical to that provided for Q3. A potentiometer is included in the a.c. coupling path between the Q3 and Q4 emitters which may be used for adjusting the amplitude of the peaked luminance signal and thus the luminance detail signal produced at the output of the high pass filter.

The coring circuit of FIG. 4 provides both symmetrical detail signal coring and detail signal amplitude control. The circuit comprises a pair of serially connected diodes D1 and D2 connected in parallel with a 1 K ohm coring level adjustment potentiometer. Forward quiescent bias is applied to the diodes by coupling each end of the parallel combination to positive and negative supply voltage points via 10 K ohm resistors. An output signal is obtained and controlled by the connection of a 2 K ohm potentiometer between the common connection of the diodes and ground, the potentiometer tap or "wiper" being connected to the coring circuit output terminal 402. The detail signal applied to the coring circuit input terminal is buffered by means of a conventional emitter follower connected transistor Q5 and capacitively coupled to both ends of the coring level adjustment potentiometer. In operation, the resistance of the coring level potentiometer places a d.c. bias across diodes D1 and D2 such that the diodes will conduct the detail signal to the output potentiometer when the detail signal exceeds the difference between the sum of the diode threshold voltages and the d.c. bias. Accordingly, by varying the setting of the coring level potentiometer one may control the coring level. The coring level, as previously explained, determines the point at which overshoot compensator 100 is effectively disabled. The amplitude of the detail signal components exceeding the coring level is controlled by adjustment of the 2 K ohm output potentiometer.

What is claimed is:

1. Apparatus for minimizing clipping distortion in a video signal processor of the type including a preemphasis means for boosting the high frequency content of an input luminance signal and clipping means for limiting the amplitude of the resultant preemphasized luminance signal to a predetermined level, said apparatus comprising:

detail filter means responsive to said input luminance signal for producing a detail signal having an amplitude representative of transitions of said input luminance signal;

delay means in said video signal processor for delaying said luminance signal by a predetermined time period prior to the application thereof to said clipping means;

circuit means for subtractively combining said detail signal and the delayed luminance signal in a timed relationship such that the detail component of the resultant combined signals precedes the luminance component of the resultant combined signals by a predetermined time and is of a sense relative to that of transitions of said luminance component to cause the resultant signal to exhibit preshoot and reduced overshoot; and means for applying said resultant signal to said clipping means.

2. Apparatus as recited in claim 1 further comprising:
   coring means connected to form a cascade connection with said detail filter means to effect attenuation of said detail signal supplied to said circuit means when said detail signal is less than a predetermined magnitude.

3. Apparatus as recited in claim 2 wherein said coring means follows said detail filter means in said cascade connection and is of a type providing substantially symmetrical coring.

4. Apparatus as recited in claim 3 wherein said coring means includes coring level adjustment means for changing the coring levels thereof symmetrically relative to substantially fixed upper and lower threshold limits.

5. Apparatus as recited in claim 1 wherein said detail filter means comprises transversal filter means having a high pass characteristic and including at least one delay element driven by a source having an output impedance substantially equal to the characteristic impedance of said delay element and wherein said delay element is terminated by termination means having an impedance other than said characteristic impedance for creating signal reflections contributory to said detail signal.

6. Apparatus as recited in claim 5 wherein said detail filter means includes at least two of said delay elements each driven by a respective driving source having an output impedance substantially equal to the characteristic impedance of its respective delay element, each of said delay elements being terminated by termination means having an impedance lower than the characteristic impedance of the element it terminates.

7. Apparatus as recited in claim 6 wherein the respective sources for driving said at least two delay elements are cascade connected and wherein said high pass characteristic is provided by deriving said detail signal from a common connection of the output impedance of the source driving the second of the two delay elements of the cascade connection and an input of the second of said two delay elements.

8. Apparatus as recited in claim 5 wherein said detail filter means comprises a transversal peaking filter connected in cascade with a high pass filter.

9. Apparatus as recited in claim 1 wherein said delay means in said video signal processor comprises a preemphasis network for preemphasizing said luminance signal prior to application thereof to said circuit means, said preemphasis network having a given delay, and wherein said detail filter means includes delay means having a delay selected with respect to said given delay such that the differential delay between said detail signal and the preemphasized luminance signal establishes said timed relationship.

10. Apparatus as recited in claim 9 wherein said preemphasis network comprises a cascade connection, in any order, of lowpass filter means having a substantially constant delay characteristic throughout the passband of said luminance signal, transversal peaking filter means and a delay element, and wherein the sum of all delays introduced by all elements of said cascade connection is selected to be substantially equal to said given delay.

11. Apparatus as recited in claim 10 wherein said input luminance signal comprises a component of a composite video signal and further comprising filter circuit means for separating said composite video signal into not less than three components a first one of which comprises said luminance signal, a second one of which comprises a signal representative of substantially only a vertical detail component of said composite signal, a third one of which comprises a chrominance signal substantially devoid of luminance components and wherein said circuit means includes means for additively combining said vertical detail component and said delayed luminance signal concurrently with subtractively combining said delayed luminance signal and said detail signal for forming said resultant signals.

12. Apparatus as recited in claim 11 further comprising means for frequency translating, clipping and summing said chrominance signal with an output signal produced by said clipping means to produce a modulating signal for controlling the frequency of a frequency modulator means.

13. Apparatus as recited in claim 1 wherein said preemphasis means includes a preemphasis network interposed between an output of said circuit means and an input of said clipping means.

14. Apparatus as recited in claim 1 wherein said preemphasis means comprises a first preemphasis network interposed between an output of said circuit means and an input of said clipping means and a second preemphasis network connected in cascade with said delay means.

15. Video signal processing apparatus, for reducing clipping distortion of an input luminance signal which may exhibit overshoot, said apparatus comprising, in combination:
    filter means responsive to transitions of said input luminance signal for producing a compensating signal having an amplitude representative of a horizontal detail component of said luminance signal;
    delay means for delaying said input luminance signal to establish a relative time difference such that said luminance signal lags said compensating signal;
    circuit means for subtractively combining the compensating signal and the delayed luminance signal to provide a compensated luminance signal;
    signal clipping means responsive to said compensated luminance signal for limiting excursions in a given sense thereof to a predetermined value; and
    means for setting said relative time difference such that said luminance signal lags said compensating signal by a predetermined time selected such that said compensating signal effects a preshoot of said compensated signal in a sense to minimize overshoot of the compensated luminance signal.

16. Apparatus as recited in claim 15 further comprising coring circuit means connected in cascade with said filter means for coring said compensating signal prior to application thereof to said circuit means.

17. Apparatus as recited in claim 16 wherein said delay means comprises luminance signal preemphasis means for providing at least a portion of the delay of said luminance signal.

18. Apparatus as recited in claim 17 wherein said preemphasis means comprises a cascade connection of a transversal peaking filter means and a lowpass filter means.

19. Apparatus as recited in claim 17 wherein said filter means comprises a transversal filter means including a delay line terminated by an impedance less than the characteristic impedance of said delay line and driven by a source through a resistance element having a value substantially equal to the characteristic impedance of said delay line and wherein said compensating signal is obtained from the common connection of said resistance element and said delay element whereby the combination of said resistance element and said delay line provides dual functions of both generating at least a portion of said compensating signal and imparting a high pass characteristic to said filter means.

20. In combination:
    comb filter means having an input for receiving a composite video signal, an additive output and a subtractive output;
    signal summing means;
    a first path coupled between said additive output of said comb filter means and said signal summing means, said first path including first means having a given delay;

a second path coupled between said subtractive output of said comb filter means and said signal summing means said second path including second means having a delay substantially equal to said given delay;

a third path coupled between said additive output of said comb filter means and said signal summing means, said third path including third means having a delay less than said given delay by a predetermined amount such that a signal passing through said third path is effectively anticipatory of a signal passing through either of said first and second paths at said summing means; and means in said third path for effectively opening said third path for signals propagated therethrough of less than a predetermined magnitude.

21. The combination recited in claim 20 further comprising means in said signal summing means for additively combining signals propagated through said first and second paths and for subtractively combining signals propagated through said third path to produce a resultant signal.

22. The combination recited in claim 21 wherein each path includes a filter means, wherein each filter means is of a type exhibiting a transfer function different from that of each of the other filter means, and further comprising circuit means for periodically clamping said resultant signal to a reference level, for delaying the periodically clamped resultant signal, and for preemphasizing the delayed periodically clamped resultant signal to produce a modulating signal for a frequency modulator.

23. In combination:

an input terminal (10) for receiving a composite video signal;

a comb filter comprising a delay line (12) having an input coupled to said input terminal (10), an adder (16) for additively combining input and output signals of the delay line and a subtractor (14) for subtractively combining input and output signals of the delay line;

a first path coupled between an output of said adder (16) and a first input of a signal combiner (46) said first path including plural elements (40, 42, 44) having a net given delay;

a second path coupled between an output of said subtractor (14) and a second input of said signal combiner (46), said second path including at least a lowpass filter means (56) having a delay substantially equal to said net given delay;

a third path coupled between said output of said adder (16) and a third input of said signal combiner (46), said third path including a cascade connection of a filter means (102), a delay means (104), a coring circuit means (106), and an inverter means (108), said third path exhibiting a delay for signals propagated therethrough less than said net given delay by a predetermined amount; and wherein said signal combiner means (46) is of a type for additively combining signals applied to its first, second and third inputs.

* * * * *